No. 810,313. PATENTED JAN. 16, 1906.
C. A. WELLMAN.
FRUIT CARRIER.
APPLICATION FILED MAR. 27, 1905.
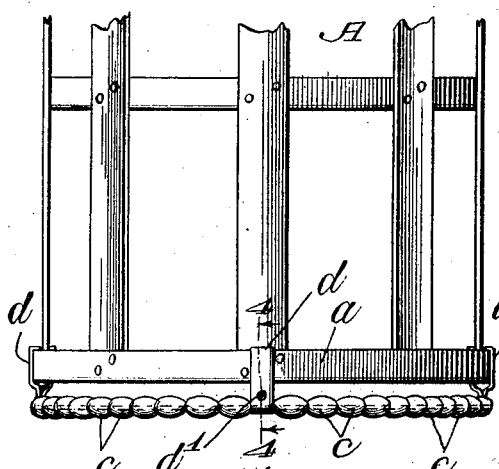
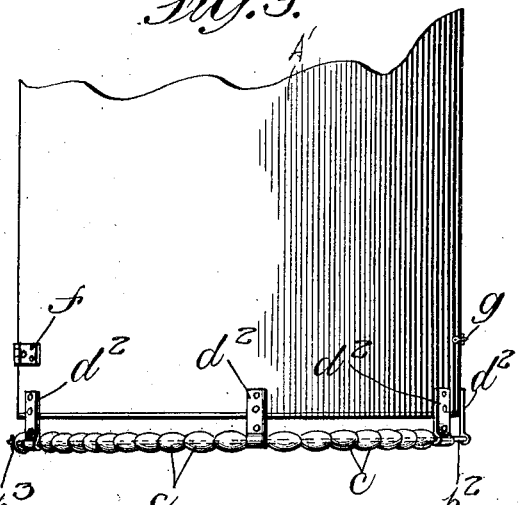
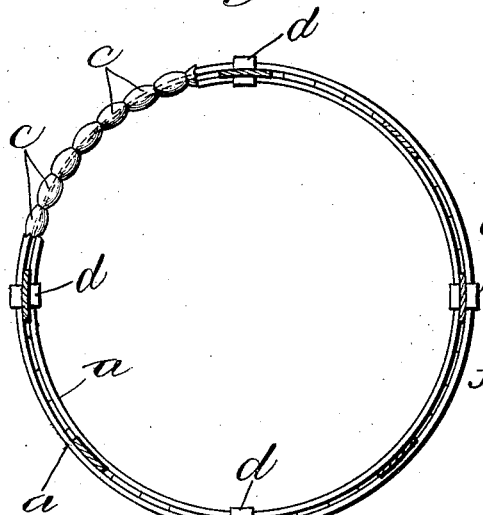
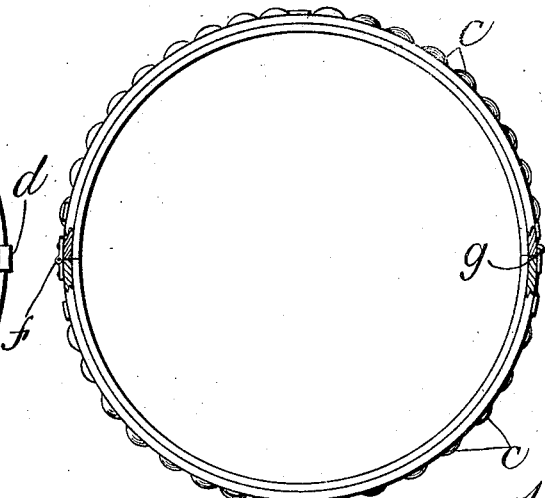
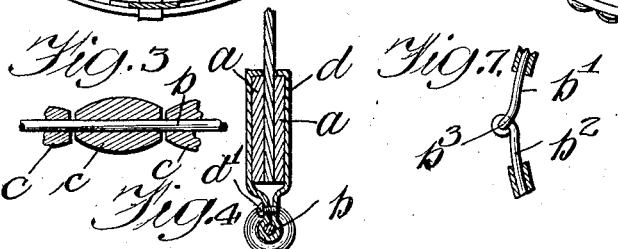
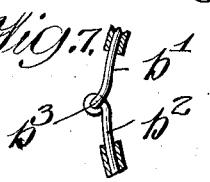
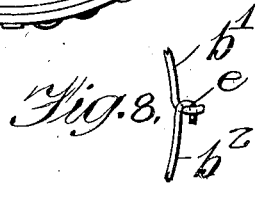
Witnesses:
G. V. Dinarus.
J. B. Weir.
Inventor:
Charles A. Wellman.
By Bond, Adams, Pickard & Jackson
Attys.

UNITED STATES PATENT OFFICE.

CHARLES ARTHUR WELLMAN, OF OTTUMWA, IOWA.

FRUIT-CARRIER.

No. 810,313.  Specification of Letters Patent.  Patented Jan. 16, 1906.

Application filed March 27, 1905. Serial No. 252,359.

*To all whom it may concern:*

Be it known that I, CHARLES ARTHUR WELLMAN, a citizen of the United States, residing at Ottumwa, in the county of Wapello, State of Iowa, have invented certain new and useful Improvements in Fruit-Carriers, of which the following is a specification, reference being had to the accompanying drawings.

This invention relates to shipping-cases carrying fruit and other articles, and primarily to what are known in the trade as "banana-traps." Such traps are of various constructions; but while differing in details of construction they are almost always cylindrical in shape, or approximately so, and of a length to adapt them to receive and properly hold long bunches of bananas, a common length being between three and four feet. In use a bunch of bananas is usually placed in a bag or coarse piece of cloth, which by strings or other fastenings is held connected to the interior of the trap and sufficiently away therefrom to prevent the bag or cloth from striking against the wall of the trap, and thus injuring the bananas. It is not deemed advisable when handling a loaded trap to roll the same on its side, as such method of handling is liable to weaken the supports of the bag or cloth, and so allow the bag or cloth to come in contact with the trap and cause a bruising and deterioration of the fruit. It is the common practice, therefore, for such traps to be tilted at an angle by the party desiring to move it and in that position to be dragged from place to place. As the traps are usually cheaply constructed and of not very strong material, such method of handling has a tendency to quickly damage the trap, frequently breaking the lower end thereof, or where such end is provided with a hoop, as is usually the case, quickly causing such hoop to become broken off or loosened, and thereby so weakening the trap as a whole as to allow the bag or cloth containing the bunch of bananas to get out of place and the bananas to become injured in consequence.

It is the object of my invention to provide an attachment to traps of the character mentioned that will enable such traps to be moved from place to place with greater ease and despatch and at the same time prevent the liability of breaking or wearing of the trap as heretofore. I accomplish this object by the means shown in the drawings and as hereinafter specifically described. That which I believe to be new will be set forth in the claims.

In the accompanying drawings, Figure 1 is a side elevation of the lower end of an ordinary form of banana-trap with my improvements applied thereto. Fig. 2 is a bottom view, partly in section. Fig. 3 is an enlarged view, being a longitudinal section through one of the series of rollers, showing also portions of two other similar rollers and also the wire frame on which such rollers are mounted. Fig. 4 is a vertical section at line 4 4 of Fig. 1. Fig. 5 is a view similar to Fig. 1, but showing my improvements applied to another form of trap, such improvements being slightly modified to adapt them for the different style or make of trap. Fig. 6 is a bottom view of the devices shown in Fig. 5, a small portion of the trap being shown in section. Figs. 7 and 8 are details of the hinge and lock employed for the wire-frame that the rollers are mounted upon when my improvements are applied to the style of trap illustrated in Figs. 5 and 6.

Referring to the several figures of the drawings, in which corresponding reference characters appear upon like parts, A indicates a cylindrical banana-trap of an ordinary form and in common use, such trap consisting of a substantially cylindrical crate in which is adapted to be secured, as before explained, a bag or cloth for containing a bunch of bananas.

*a* indicates the usual double wooden hoop at the lower end of the trap and upon which the effects of the rough handling of the trap in the manner hereinbefore explained generally first appear.

*b* indicates a wire frame bent into annular shape to conform to the shape of the trap.

*c* indicates a series of rollers, which, as shown in the drawings, are elongated in shape, but which of course can be otherwise shaped, if desired. Each roller has an opening through it to adapt it to be placed on the wire frame, the rollers being free to turn on the wire.

*d* indicates clasps attached to the lower end of the trap and depending therefrom and having secured at their lower ends in any suitable manner the wire frame *b* and held together just above the frame by a suitable rivet *d'*. Above this rivet the sides of the clasp are bent to form suitable shoulders on which the weight of the trap rests. The upper portions of the clasp embrace the double hoop *a* and have their ends turned inwardly over the top of such hoop, so as to hold the wire frame *b* and the series of rollers *c* thereon in place when the trap is lifted.

In the remaining figures of the drawings I have shown a form of carrier or trap made in two main parts hinged together at one side and held together at the opposite side by any suitable catch. When my improvements are used in connection with a device of this character, it is necessary that the wire frame which carries the rollers be also made in two parts, so as to swing open when the trap is opened. To accomplish this, I make an annular frame of two pieces of wire *b'* and *b²* and connect them together by a hinge *b³*, preferably formed of two interlocking eyes formed at adjacent ends of the wires, as clearly shown in Fig. 7, the opposite ends of the wires being bent to adapt them to hook over each other, as shown best at *e*, Fig. 8. In the modification the trap is indicated by A', its hinge by *f*, and its lock on the opposite side from the hinge by *g*. In this construction the clasps are indicated by *d²* and are shown as held in place by small nails driven through them into the lower end of the trap. Any other manner of fastening such clasps in place can of course be adopted. The rollers shown in the modification are exactly the same as shown in the construction first described and are therefore lettered the same.

By my invention I provide an attachment that can be made with but little expense and that can be readily applied to forms of banana-traps now in common use and when so applied will enable a trap to be dragged along over a floor or sidewalk in an inclined position, as is the customary way of moving these traps around a building or on a sidewalk, with but little friction and with practically no liability of breaking or injuring the lower end of the trap. By having a large number of these rollers and having them beneath all points of the lower end of the trap the trap can be caught hold of at any place at the upper end and turned into an inclined position and always have a suitable number of rollers to run upon and support it.

What I claim as new, and desire to secure by Letters Patent, is—

1. The combination with a shipping-case, of a wire frame, a series of rollers loosely mounted thereon, and clasps attached to said wire frame and adapted to engage the case and hold said roller-carrier frame away from the case, substantially as specified.

2. The combination with a shipping-case, of an annular frame formed of wire, a series of rollers thereon, and connections between said case and frame that are adapted to hold said frame and rollers a short distance away from said case, substantially as specified.

3. The combination with a shipping-case, of a wire frame, a series of rollers mounted thereon, and clasps attached to said wire frame, said clasps being adapted to embrace the lower edge of the case, substantially as specified.

4. The combination with a shipping-case, of a wire frame, a series of rollers mounted thereon, and clasps attached to said wire frame, said clasps being adapted to embrace the lower edge of the case and being provided with shoulders on which the lower edge of the case is adapted to rest, substantially as specified.

CHARLES ARTHUR WELLMAN.

Witnesses:
MINERVA WELLMAN,
JNO. W. DUREE.